Figure 1:
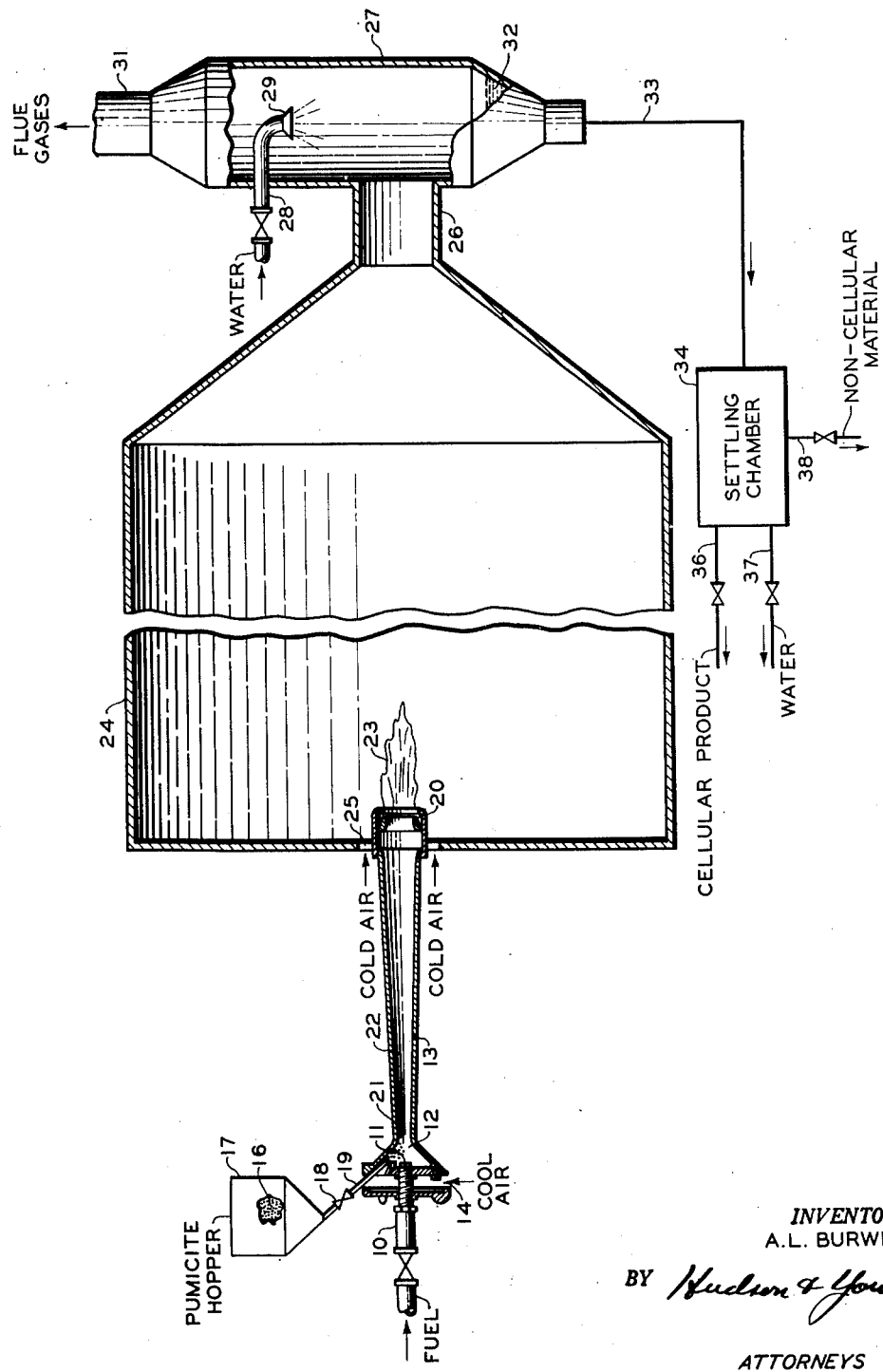

May 5, 1953      A. L. BURWELL      2,637,702

METHOD OF CONVERTING VOLCANIC ASH TO CELLULAR PARTICLES

Filed Oct. 3, 1949      2 SHEETS—SHEET 1

INVENTOR.
A. L. BURWELL
BY Hudson & Young
ATTORNEYS

RAW PUMICITE 41 X
REFLECTED LIGHT

RAW PUMICITE 41 X
TRANSMITTED LIGHT

POPPED PUMICITE 41 X
REFLECTED LIGHT

POPPED PUMICITE 41 X
TRANSMITTED LIGHT

INVENTOR.
A. L. BURWELL

BY Hudson & Young

ATTORNEYS

Patented May 5, 1953

2,637,702

UNITED STATES PATENT OFFICE 2,637,702

METHOD OF CONVERTING VOLCANIC ASH TO CELLULAR PARTICLES

Albert L. Burwell, Norman, Okla., assignor to University of Oklahoma Research Institute, a corporation of Oklahoma Application October 3, 1949, Serial No. 119,257

7 Claims. (Cl. 252—378)

This invention relates to a thermal treatment of small, sharp angular grains of volcanic glass to produce a light-weight, cellular material. In one embodiment this invention relates to a method for the expansion and cellulation of glassy volcanic rock. In another embodiment this invention relates to a process wherein pumicite, comprising particles of a fine powdery unconsolidated volcanic ash, is "popped" to form a particulate cellular body lighter in weight and greater in volume than the original particulate material.

Cellular materials made from volcanic rock are lighter in weight and greater in volume than the original material and are especially suitable for use as insulating materials, and as component materials of various light weight concretes. In order that glassy volcanic rock may be converted to such particulate cellular materials, I have found that it is necessary to bring the raw material into a thermoplastic condition of relatively high viscosity, and for the generation or liberation of gases or vapors from within the material itself, while in the highly viscous thermoplastic stage. The gases or vapors may be grouped as (1) water vapor from water occluded or dissolved in the solid material and (2) gaseous decomposition products of the solid material.

Various methods have been proposed for the conversion of glassy volcanic rock into the lighter weight products. In accordance with a number of these proposed processes, the glassy material to be converted is heated in a furnace, or rotary kiln, or other conventional type of heating vessel, at temperatures carefully controlled so that a slow or gradual increase of temperature is applied over a prolonged operating period. Operating in this manner, some of the particles agglutinate upon becoming thermoplastic, and also adhere to parts of the heating vessel. This difficulty is especially great when treating volcanic ash, due apparently to the small size of the individual particles. Furthermore, as a result of such prolonged heating, many of the cells that are formed, rupture, while others become larger, and the cell walls increase in thickness. Resulting agglutinated product must generally be ground for utilization, and this step results in the destruction of many of the surviving large cells. The resulting products are not cellular in nature.

Obviously, such prolonged heating, and any subsequent grinding of agglutinate that may be necessary, are highly undesirable since under these conditions, a less cellular product is obtained and its versatility is correspondingly decreased.

This invention is concerned with a new and novel process wherein a powdery unconsolidated glassy volcanic rock is efficiently and economically converted to an unagglutinated, highly cellular product, while maintaining the raw material in a thermoplastic condition for a time much shorter than utilized heretofore.

An object of this invention is to provide for the manufacture of a cellular material from glassy volcanic rock.

Another object is to provide for the conversion of volcanic ash to a light-weight, cellular material.

Another object is to utilize volcanic ash in the manufacture of new and novel insulating materials.

Another object is to provide for the expansion of individual volcanic ash shards or flakes into enlarged light-weight cellular particles.

Other objects will be apparent to one skilled in the art, from the accompanying disclosure and discussion.

In accordance with my invention dense glassy shards of unconsolidated volcanic rock are converted to lighter weight cellular particles by quickly heating the unconsolidated particles from an ordinary temperature to a viscous thermoplastic condition while they are suspended in flight through a flame of controlled intensity, and then suddenly cooling them in a relatively cool receiving zone upon ejection from the flame. My invention is particularly well applied to volcanic ash, or dust, known also as pumicite, as a starting material. Operating in this manner, the dense glassy shards are suddenly, almost instantaneously, heated to the requisite viscous thermoplastic condition, at which time gases or vapors are liberated from within the glassy starting material itself, and are retained in cells created in the mass by the expanding vapor. Assurance of retention of the vapor in the cells is obtained by the equally sudden cooling or "chilling" of the ejected particles to a temperature below the thermoplastic stage. Under these conditions of quick heating, short residence time, (i. e. the time during which the particles are passed through the flame) and quick chilling upon ejection of the particles from the flame, gases liberated from within the glassy material do not have time to escape or rupture the resulting cells, but are retained in the thermoplastic mass, thus causing expansion of the mass and cellulation; the plastic particles have little chance, if any at all, to agglutinate or stick together, or to adhere or stick to equipment parts with which they might come into contact.

The range of temperature in which thermoplastic conditions are preferably maintained is about 1100 to 1400° C., since at a temperature below this range the glassy volcanic material has such a high viscosity that cellulation does not occur, whereas at a temperature above this range, viscosity of the thermoplastic material is so low that gases or vapors escape from the thermoplastic mass so that product particles are formed, which upon cooling, are noncellular glassy solids. My invention is to be distinguished from any process which proposes the formation of such solid noncellular glassy particles from the unconsolidated volcanic rock starting material that I employ.

In a preferred embodiment of my invention, I introduce the material, at ordinary temperatures, to be converted, in suspension in a combustible fuel gas mixture being passed to a burner, and then burn the particle-containing combustible fuel mixture at the burner nozzle. The flame temperature is usually controlled at a level within the range of 1100 to 1400° C., frequently between 1250 and 1400° C. The combustion or flue gas contains cellular product in suspension, and is quickly cooled and passed to a product recovery step.

The intensity of the flame depends upon the B. t. u. content of the gas, the efficiency of the burner, the initial temperature of each of the components making up the total fuel gas suspension, and the proportions of all three of these components in the combustible fuel gas suspension. The duration, i. e. time of contact of the particles in the flame, depends upon the length of the flame and the pressure under which the mixture leaves the nozzle of the burner. The length of the flame will depend, of course, upon the size, capacity, and shape of the burner. Contact times are always below one second, and generally they do not exceed 0.1 second, a preferred range being from 0.0001 to 0.1 second.

Generally, I prefer to introduce a controlled stream of the finely divided volcanic material into the air intake of an inspirator-type burner so that the glassy volcanic material to be suspended, is intimately mixed with the unheated air and fuel gas in the Venturi tube of the burner. The flame is preferably not confined in any way, but rather, permitted to extend into a large unobstructed and relatively cool receiving zone. In this manner the charged solid material is instantly heated to the desired high temperature and the resulting cellular product, ejected from the flame, is instantly chilled.

Recovery of chilled product can be carried out in any desired manner, such as by mechanical settling, precipitation by conventional Cottrell-type apparatus, water spray washing, separation in a cyclone separating apparatus, or the like.

The cellular particle product of my invention has a greater volume and a lower specific gravity than that of the original particle. The shape tends to be irregular. Each particle product is glassy and contains one or more cells and can be referred to as "popping product."

In the following description preferred means for conducting the process of my invention is disclosed. Figure 1 is a diagrammatic illustration of apparatus in which my process may be practiced, and includes a schematic flow sheet illustrating basic process steps of my invention together with a transverse sectional view of one type of burner that can be used in the practice of my invention. It is to be understood that Figure 1 is diagrammatic only and that it may be altered in many respects by those skilled in the art and yet remain within the intended scope of my invention.

Figure 2:
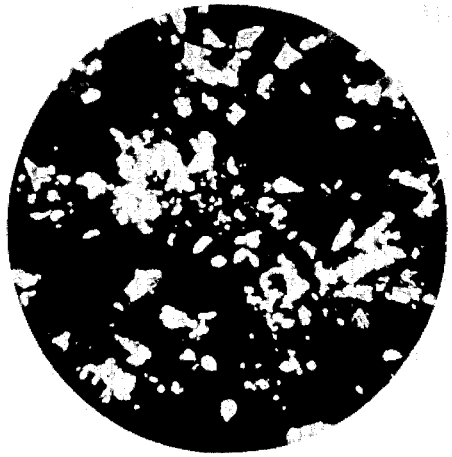
Figure 3:
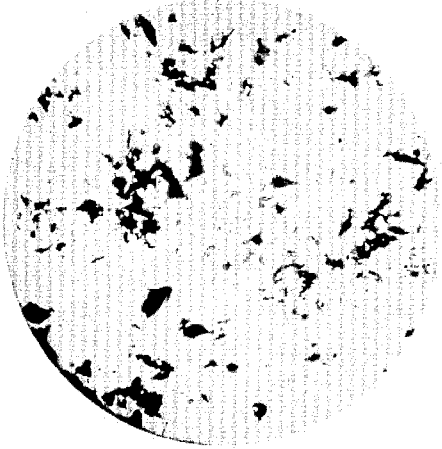
Figure 4:
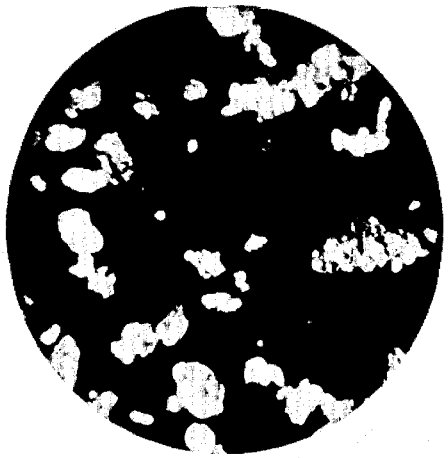
Figure 5:
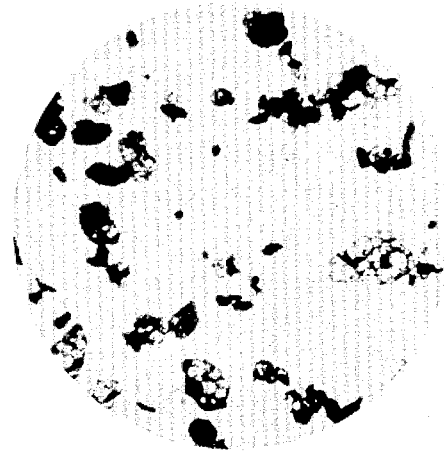

Figures 2, 3, 4 and 5 are photomicrographs providing a visual comparison of the cellular product of my invention with the "raw pumicite" starting material. Figures 2 and 3 are photomicrographs of the same sample of a raw pumicite starting material taken at a magnification of 41X, the former having been taken by reflected light and the latter by transmitted light. Figures 4 and 5 are photomicrographs of the same sample of cellular "popped pumicite" product taken at the same magnification, 41X, the former having been taken by reflected light and the latter by transmitted light. Figures 2 and 3 show the characteristics of the individual raw shards, or flakes. Several of the particles shown in these figures, especially illustrate their dense, glassy, and fragmentary nature. Figures 4 and 5 show the characteristics of the cellular product of my invention. Several of the particles shown are especially transparent and particularly illustrate the amount of expansion that has taken place and the cellular nature of the expanded material.

Referring to Figure 1, fuel gas from line 10 is passed through orifice 11 into Venturi throat 12 of inspirator burner 13. Air is drawn from a source, not shown, generally from the atmosphere, into Venturi throat 12 through air intake 14 and mixed in throat 12 with fuel gas. Volcanic ash, or pumicite 16 in hopper 17 is introduced at a controlled rate through valve 18 and line 19 through air intake 14 into Venturi throat 12, and a resulting air-fuel-volcanic ash admixture in zone 12 is passed through Venturi orifice 21, completely mixed in exit throat 22, passed to burner nozzle 20, and burned to form flame 23. The volcanic particles initially in suspension in the combustible mixture to be burned are thus passed in flight through flame 23. The ratio of air to fuel in the suspension entering nozzle 20 is sufficiently great for the development of a flame temperature within the limits of about 1100 to 1400° C.

Flame 23 is directed into product collection zone 24, maintained at a temperature well below 1100° C., generally from 50 to 300° C.; particles ejected from flame 23 are thereby quickly chilled. This can be facilitated by permitting air, at atmospheric temperature, to enter zone 24 through an annulus 25 surrounding nozzle 20 in sufficient amounts to provide the necessary shock cooling. Zone 24 is of such size as to permit flame 23 to be maintained in an unconfined space. Flue gas, containing suspended solids is passed from zone 24 through passageway 26 into washing zone 27, wherein it is washed with water introduced as a spray from line 28 and water spray nozzle 29, to recover suspended solids. Washed flue gas, substantially free of solids, is passed from the system through passage 31. A water slurry 32 containing solids separated from flue gas in zone 27, collects in the bottom of zone 27 and is passed through line 33 to settling chamber 34. Resulting cellular particles are lighter than water, and separate in zone 34 as a top layer of the settled slurry, and are withdrawn from zone 34 through line 36. Water is withdrawn through line 37, and can be recycled to line 28, if desired. Any noncellular material, e. g. unchanged glassy shards, present in slurry 32 is heavier than water and settles to the bottom of zone 34, and is withdrawn through line 38. In some instances zone 24 is sufficiently large that cellular product settles to the floor or bottom, from which it can be directly collected. With such a procedure, the water spray arrangement may be unnecessary and can be omitted.

The ratio of volcanic ash to the total combustible fuel gas mixture introduced into the burning zone, is of course, maintained at the maximum level in order to most economically utilize the fuel burned. I have found that when completely burning natural gas, having about 1100 B. t. u. content per 1000 cubic feet, with air, I can introduce volcanic ash into the air intake of the burner as described above, in a proportion of about 10 to 15 pounds per 1000 cubic feet of total combustible mixture introduced. The maximum value for such a proportion that applies in any specific case, is of course, dependent on the volume of gases fed to the burner, the B. t. u. content of the gas, burner design, and the like.

Although I generally prefer to utilize a fuel gas such as natural gas, in the practice of my invention, it is to be understood that liquid or solid fuels can be employed, when desired. For example, a liquid fuel such as a gas oil, containing pumicite in suspension can be burned in a liquid fuel burner, or, if desired, a liquid fuel containing suspended pumicite can first be flash vaporized, and then burned. When employing a solid fuel, such as coal, for example, the solid can be pulverized to a fine powdery state and blown together with pumicite charge material in suspension in air, and burned. In any case, the pumicite charge material can be fed to the air intake of a burner employing any type of fuel, i. e. gaseous, liquid or solid.

I am not exactly certain as to the identity of the gases liberated from within the thermoplastic mass during the popping step of my invention. However, it is probable that the source of the gas or vapor is occluded or dissolved water in the solid material, although another possible source is gaseous decomposition product of the thermoplastic material, such as, for example, oxygen released through a change of iron oxide from the ferric to the ferrous state. Whatever the gases or vapor, they are generated within the material itself during the time that the mass is thermoplastic, and sufficiently viscous to hold the gas in nonconnecting voids. The volcanic material converted in accordance with my invention should contain at least a small percent of bound or occluded water such as at least 1 per cent. This bound or occluded water is characterized in not being removed by heating the material to about 100° C. at atmospheric pressure for a prolonged period, i. e. such water can be removed only by heating to a temperature of 300 to 400° C. or higher. Generally, volcanic ash contains several per cent of such water. It is an important feature of my invention that the initial granular or powdery material is not preheated, or so treated as to remove this small amount of bound or occluded moisture. If such a procedure is followed cellular particles will not be produced, but instead the product will consist essentially of small, solid spherules. In commercial operations some economies can be effected by conventional heat-exchange to preheat the combustible gas mixture and the powdery volcanic ash, but this preheating should be limited so that the necessary amount of gas-forming material is not set loose or removed. Thus, such a preheat temperature should usually not exceed about 300 to 400° C.

The particle size of volcanic ash material introduced into suspension in the fuel gas mixture can be the same as is frequently found in naturally-occurring deposits. When converting relatively large particles, such as for example, those having a maximum cross sectional dimension of 350 microns, and larger, it is advisable to employ a longer flame than is otherwise necessary, for the purpose of providing a longer contact time of the particle in the requisite thermoplastic stage.

In Table I are shown comparative data illustrative of the changes in particle size of the original glassy shards of volcanic ash material that take place with expansion and cellulation, in accordance with my invention. The particle size of the material used should be such that it will pass through a sieve having an opening not greater than 1.0 millimeter, and usually the diameter of the largest particles will be less than 350 microns, as illustrated in Table I.

TABLE I

*Effect of popping on particle size of representative samples of volcanic ash*

| Size In Microns | Percent By Weight | | | | | | | | | | |
|---|---|---|---|---|---|---|---|---|---|---|---|
| | Over 350 | 350-177 | 177-124 | 124-88 | 88-63 | 63-43 | 43-40 | 40-30 | 30-20 | 20-10 | <10 |
| Source: | | | | | | | | | | | |
| Beaver County, Oklahoma— | | | | | | | | | | | |
| Original Ash | | 0.3 | 0.6 | 1.4 | 1.4 | 3.6 | 1.1 | 6.1 | 23.7 | 37.4 | 24.1 |
| Popped Ash | 5.1 | 7.0 | 8.3 | 8.4 | 12.6 | 13.1 | (------ | 92.4 45.6 | ------ | ------ | ------) |
| Wagoner County, Oklahoma— | | | | | | | | 51.2 | | | |
| Original Ash | | 1.6 | 3.6 | 9.2 | 9.0 | 24.8 | 9.7 | 14.6 | 13.8 | 8.4 | 4.7 |
| Popped Ash | 2.1 | 17.0 | 17.8 | 17.8 | 16.6 | 11.2 | (------ | 17.2 | ------ | ------ | ------) |

In Table II are shown data illustrative of one type of volcanic glassy shard material that can be converted to lighter particulate cellular product in accordance with my invention. These data show the mineral composition of three different samples of such volcanic materials, by size grades.

TABLE II
*Mineral composition of volcanic ash, by size grades*

| Size Gradation, Diameter In Microns | 351-246 | 246-177 | 177-124 | 124-88 | 88-62 | 62-43 | 43-40 | 40-30 | 30-20 | 20-10 | <10 | Cumulative Mineral Percent |
|---|---|---|---|---|---|---|---|---|---|---|---|---|
| Source: | | | | | | | | | | | | |
| Beaver County, Oklahoma— | | | | | | | | | | | | |
| Size Grade, Percent By Wt. Of Total | 0.2 | 0.4 | 0.6 | 1.4 | 1.4 | 3.6 | 1.1 | 6.1 | 23.7 | 37.4 | 24.1 | |
| Percent Glass Shards | 0.20 | 0.40 | 0.60 | 1.39 | 1.39 | 3.57 | 1.08 | 5.97 | 23.01 | 36.47 | 23.71 | 97.79 |
| Percent Orthoclase | | | | 0.00 | 0.00 | 0.01 | 0.01 | 0.06 | 0.31 | 0.41 | 0.14 | 0.94 |
| Percent Quartz | | | | 0.01 | 0.01 | 0.01 | 0.00 | 0.02 | 0.09 | 0.11 | 0.05 | 0.30 |
| Percent Aggregates | | | | 0.00 | 0.00 | 0.01 | 0.01 | 0.05 | 0.28 | 0.41 | 0.19 | 0.95 |
| | | | | | | | | | | | | 99.98 |
| Hughes County, Oklahoma— | | | | | | | | | | | | |
| Size Grade, Percent By Wt. Of Total | 0.8 | 3.0 | 6.6 | 11.2 | 8.6 | 22.8 | 8.6 | 13.3 | 12.4 | 8.2 | 4.1 | |
| Percent Glass Shards | 0.57 | 2.23 | 5.11 | 9.13 | 7.59 | 21.61 | 8.00 | 12.26 | 11.37 | 7.58 | 3.97 | 89.42 |
| Percent Quartz | 0.13 | 0.47 | 0.86 | 1.25 | 0.69 | 0.84 | 0.36 | 0.56 | 0.56 | 0.30 | 0.05 | 6.07 |
| Percent Orthoclase | 0.02 | 0.10 | 0.26 | 0.56 | 0.24 | 0.34 | 0.15 | 0.24 | 0.22 | 0.12 | 0.01 | 2.26 |
| Percent Biotite | | | | | | | | | 0.06 | 0.04 | 0.02 | 0.12 |
| Percent Clay Aggregates | 0.07 | 0.20 | 0.33 | 0.27 | 0.09 | 0.00 | 0.09 | 0.16 | 0.19 | 0.11 | 0.04 | 1.55 |
| | | | | | | | | | | | | 99.42 |
| Wagoner County, Oklahoma— | | | | | | | | | | | | |
| Size Grade, Percent By Wt. Of Total | 0.6 | 1.0 | 3.6 | 9.2 | 9.0 | 24.8 | 9.7 | 14.6 | 13.8 | 8.4 | 4.7 | |
| Percent Glass Shards | 0.59 | 0.98 | 3.49 | 9.02 | 8.85 | 23.09 | 8.63 | 12.85 | 11.65 | 6.80 | 3.44 | 89.39 |
| Percent Quartz | | | | | 0.01 | 0.84 | 0.63 | 1.00 | 0.98 | 0.59 | 0.23 | 4.28 |
| Percent Orthoclase | | | | | 0.01 | 0.37 | 0.27 | 0.44 | 0.47 | 0.27 | 0.10 | 1.93 |
| Percent Clay Aggregates | 0.01 | 0.02 | 0.08 | 0.15 | 0.11 | 0.35 | 0.24 | 0.41 | 0.51 | 0.34 | 0.25 | 2.47 |
| Percent Mica | 0.00 | 0.00 | 0.02 | 0.05 | 0.02 | 0.12 | 0.05 | 0.07 | 0.14 | 0.16 | 0.31 | 0.94 |
| Percent Diatoms | | | | | | | | | | | 0.34 | 0.34 |
| | | | | | | | | | | | | 99.32 |

In Table III are shown comparative data illustrative of the change in specific gravity of the glassy volcanic shard material that takes place with expansion and cellulation in accordance with my invention. True specific gravity as referred to herein is the specific gravity of the solid substance of which the material is composed and is exclusive of all cells and open pores. Apparent specific gravity herein is the specific gravity of the water impermeable portion of the material, i. e., solid material plus cells (cell cavities). Bulk specific gravity herein is the specific gravity of the composite bulk, i. e., the solid material plus cells and open, or water-permeable, pores and interparticle spaces. In the case of a powder or unconsolidated particles such as volcanic ash, bulk specific gravity also includes the space between the particles. Since the original shard material is neither permeable or cellular, cellulation can be measured by comparison of the true specific gravity of the original shard material with the apparent specific gravity of the processed material, i. e. the cellular product.

Generally the true specific gravity of volcanic ash employed as a starting material herein, is at least as high as 2, and the apparent specific gravity of the cellular product from popping such volcanic ash is generally within the limits of 0.2 to 1.

TABLE III
*Specific gravity comparison original volcanic vs. popped volcanic ash*

| Sample | Source | True Specific Gravity | Apparent Specific Gravity | Bulk Specific Gravity |
|---|---|---|---|---|
| 1 | Beaver County, Okla.: | | | |
| | Original | 2.34 | | 0.69 |
| | Popped | | 0.55 | 0.22 |
| 2 | Wagoner County, Okla.: | | | |
| | Original | 2.36 | | 0.89 |
| | Popped | | 0.32 | 0.095 |
| 3 | Hughes County, Okla.: | | | |
| | Original | 2.39 | | 0.81 |
| | Popped | | 0.30 | 0.088 |

In Table IV are shown analytical data determined from 16 different samples of volcanic ash, illustrative of the chemical composition of the volcanic ash materials that can be popped in accordance with my invention. In general, the composition and properties of these materials are such that the materials can be said to have a rhyolitic composition.

TABLE IV
*Analyses of volcanic ash and certain clays for comparison with volcanic ash*

| Sample No. | $SiO_2$ | $R_2O_3$ | $Al_2O_3$ | $Fe_2O_3$ | CaO | MgO | $K_2O$ | $Na_2O$ | LOI[1] @ 1,000° C. | $H_2O$ Below 105° C. | S |
|---|---|---|---|---|---|---|---|---|---|---|---|
| 1 | 72.65 | 14.39 | 12.47 | 1.82 | 1.78 | 0.53 | | | 4.76 | 0.72 | 0.01 |
| 2 | 67.99 | 17.46 | 15.70 | 1.77 | 0.62 | 0.27 | | | 6.96 | 1.56 | 0.01 |
| 3 | 76.05 | 13.30 | 10.54 | 2.76 | 0.61 | 0.41 | 3.35 | 2.04 | 4.40 | 1.29 | |
| 4 | 72.11 | 14.58 | 12.19 | 2.39 | 0.68 | 0.38 | 4.07 | 2.55 | 5.85 | 1.30 | |
| 5 | 69.65 | 16.13 | 13.13 | 3.00 | 0.71 | 0.47 | 3.25 | 2.28 | 7.58 | 2.16 | 0.01 |
| 6 | 72.06 | 14.42 | 12.41 | 2.01 | 0.78 | 0.35 | 3.98 | 2.41 | 6.01 | 0.89 | |
| 7 | 73.69 | 13.64 | 11.43 | 2.21 | 0.74 | 0.32 | 3.52 | 2.41 | 5.90 | 0.96 | 0.01 |
| 8 | 72.03 | 15.05 | 11.53 | 2.52 | 1.74 | 0.27 | | | 4.89 | 0.24 | 0.01 |
| 9 | 75.72 | 16.42 | 14.00 | 2.42 | 0.91 | 0.56 | | | 1.74 | 0.16 | |
| 10 | 72.74 | 13.47 | 11.55 | 1.92 | 0.64 | 0.17 | 4.84 | 2.93 | 5.46 | 0.81 | 0.01 |
| 11 | 73.16 | 14.05 | 12.25 | 1.80 | 0.68 | 0.23 | 4.89 | 2.57 | 5.27 | 0.89 | 0.01 |
| 12 | 73.58 | 14.37 | 13.22 | 1.15 | 1.35 | 0.21 | | | 3.60 | 0.29 | |
| 13 | 72.55 | 15.73 | 14.01 | 1.72 | 1.14 | 0.37 | | | 4.22 | 0.47 | 0.01 |
| 14 | 66.64 | 15.00 | 13.34 | 1.66 | 1.93 | 1.35 | | | 11.23 | 4.18 | 0.01 |
| 15 | 50.83 | 18.49 | 15.93 | 2.56 | 3.23 | 4.32 | | | 24.08 | 15.63 | |
| 16 | 56.42 | 16.36 | 14.48 | 1.88 | 2.58 | 3.79 | | | 20.73 | 13.14 | |

[1] Loss on ignition.

My invention is further illustrated by the following example. The reactants, their proportions, and other specific ingredients are presented as being typical and should not be construed as to limit the invention unduly.

Natural gas containing about 1100 B. t. u. per cubic foot was introduced at a pressure of 5 p. s. i. g., and at a rate of about 256 cubic feet per hour, into an inspirator burner having a No. 31 orifice. The burner was of the type illustrated in Figure 1 of the drawings. Volcanic ash having a true specific gravity of 2.27, was supplied to the air inlet of the burner, at the rate of 33 pounds per hour. The temperature in the flame produced by the burning was from about 1200 to 1300° C. At a feed rate of volcanic ash in excess of the 33 pounds per hour feed rate above mentioned, the flame in the burner was extinguished. From the total combustion effluent, was recovered a cellular product having an apparent specific gravity of 0.030, in contrast with the true specific gravity of 2.27 of the original unprocessed ash.

Under the microscope the original glassy flakes or shards were found to be changed into irregular-shaped glassy particles containing one or more bubbles, giving the appearance of minature glassy popcorn. These particles were found to float on water and retain that property even after prolonged contact. The original, or unprocessed particles, do not float on water.

As will be evident to those skilled in the art, various modifications of this invention can be made, or followed, in the light of the foregoing disclosure and discussion, without departing from the spirit or scope of the disclosure or from the scope of the claims.

I claim:

1. A process for cellulating and expanding particles of glassy volcanic rock of rhyolitic composition and containing more than 1 per cent water by weight, the water-impermeable portion of said particle having a weight per unit volume greater than 2 and particle size that will pass through a sieve having openings not greater than 1.0 millimeter, consisting in intimately mixing the particles while at a temperature not exceeding 400° C. with a combustible air-fuel mixture, in proportions that will yield a temperature in the ignited mixture in the range from 1250 to 1400° C., igniting the resulting mixture and controlling the pressure and length of flame so the time the particles are exposed to the processing temperature will be less than 0.1 second, passing the products of combustion in a horizontal direction and immediately mixing the horizontally flowing combustion products with cooler surrounding air on leaving the flame so as to quickly chill the thermoplastic particles therein to a temperature below 1100° C., thereby chilling and retaining the cellulated and expanded condition due to the thermoplastic state and vaporized water obtained at the above temperature and in the specified time.

2. In a process for cellulating particulate glassy volcanic rock containing at least 1 weight per cent water, wherein said volcanic rock is maintained in an intimate admixture at a temperature not exceeding 400° C. with a combustible gas mixture to be burned and then suspended in flight through a flame resulting from such burning, the improvement comprising burning in an unconfined space a horizontally flowing stream of air and fuel gas containing said suspended particles and continuing to pass resulting combustion effluents in a horizontal direction while immediately mixing same with unheated atmospheric air so as to cool resulting thermoplastic cellular particles suspended therein to form solid cellular particles, regulating the proportions of air and fuel in said fuel-gas stream so as to produce a flame at a temperature within the limits of 1100 and 1400° C. when burned, and regulating the time of flight of volcanic rock particles through said horizontal flame within the limits of 0.0001 and 0.1 second.

3. The process of claim 2 wherein the particulate glassy volcanic rock is introduced into admixture with a combustible fuel-air mixture at a rate not exceeding 15 pounds per 1000 cubic feet of total combustible mixture.

4. The process of claim 2 wherein said particulate volcanic rock has a specific gravity of at least 2, and wherein resulting cellulated product has an apparent specific gravity within the limits of 0.1 and 1.

5. A process for the manufacture of a particulate cellular expanded volcanic ash, comprising introducing volcanic ash comprised of particles having a maximum cross sectional dimension not exceeding 350 microns, a true specific gravity of at least 2, and containing at least 1 per cent water which is not removable by heating to 100° C. into a horizontally flowing combustible fuel gas stream containing fuel gas and a combustion-supporting gas in proportions for burning to produce a flame, at a temperature within the limits of 1100 and 1400° C., effecting the introduction of said volcanic ash material into said combustible fuel gas stream at a rate not exceeding 15 pounds per 1000 cubic feet of total combustible fuel gas mixture, while at a temperature below 400° C., burning the resulting horizontally flowing admixture of fuel gas combustion-supporting gas and volcanic ash in an unconfined space and passing said ash through a resulting flame maintained horizontally, at a time of flight therethrough within the limits of 0.0001 to 0.1 second, whereby particles of said ash while in said flame are rapidly heated to a viscous thermoplastic state, passing effluent from said burning in a horizontal direction and immediately mixing unheated air with the horizontally flowing effluent so as to quickly chill thermoplastic particles therein to a temperature below 1100° C., and recovering a particulate cellular expanded volcanic ash having an apparent specific gravity within the limits of 0.2 to 1 from a cooled effluent from said flame as a product of the process.

6. A process for producing a powdery expanded and cellular volcanic ash having an apparent specific gravity within the limits of 0.2 to 1 from a powdery volcanic ash having a true specific gravity of at least 2 and containing at least 1 per cent water by weight, which comprises heating such a volcanic ash material dispersed at an initial temperature not exceeding 400° C. in a gaseous medium flowing in a horizontal direction through an unconfined space at a temperature within the limits of 1100 and 1400° C., for a time not exceeding 0.1 second and thereafter immediately mixing same while flowing in a horizontal direction, with unheated air so as to effect immediate cooling thereof, and recovering a powdery expanded and cellular volcanic ash so produced.

7. A process for producing a powdery expanded and cellular volcanic ash having an apparent specific gravity within the limits of 0.2 to 1, from a powdery volcanic ash having a true specific gravity of at least 2 and containing at least 1 per cent water by weight not removable by heating at 100° C., which comprises heating such a volcanic ash material dispersed at an initial temperature not exceeding 400° C. in a gaseous medium flowing in a horizontal direction through an unconfined space at a temperature within the limits of 1100 and 1400° C., for a time of flight requisite for the volcanic ash particles to reach a plastic cellular state, and then immediately mixing the resulting plastic particles, while flowing in a horizontal direction, with unheated air so as to quickly chill said plastic particles to preserve their cellular structure, and recovering a particulate expanded and cellular volcanic ash so produced.

ALBERT L. BURWELL.

References Cited in the file of this patent

UNITED STATES PATENTS

| Number | Name | Date |
|---|---|---|
| 2,306,462 | Moorman | Dec. 29, 1942 |
| 2,431,884 | Neuschotz | Dec. 2, 1947 |
| 2,496,203 | Flint et al. | Jan. 31, 1950 |
| 2,501,962 | Pierce | Mar. 28, 1950 |

OTHER REFERENCES

Univ. of Ariz., Bulletin, vol. 15, No. 4, Oct. 1944, pg. 34.

King: Calif. Journal of Mines & Geology, vol. 44, No. 3, July 1948, pgs. 315–316, Div. of Mines, Ferry Bldg., San Francisco, Calif.